United States Patent
Castro et al.

(10) Patent No.: US 10,325,446 B2
(45) Date of Patent: Jun. 18, 2019

(54) MULTI-ZONE PLAYER INTERFACE DECK FOR A GAMING MACHINE

(71) Applicant: Bally Gaming, Inc., Las Vegas, NV (US)

(72) Inventors: Christian Louis Castro, Chicago, IL (US); Robert James Glenn, II, Chicago, IL (US); Paul Michael Lesley, Chicago, IL (US); Timothy C. Loose, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 36 days.

(21) Appl. No.: 15/701,813

(22) Filed: Sep. 12, 2017

(65) Prior Publication Data

US 2018/0075689 A1  Mar. 15, 2018

Related U.S. Application Data

(60) Provisional application No. 62/394,424, filed on Sep. 14, 2016.

(51) Int. Cl.
*A63F 9/00* (2006.01)
*G07F 17/32* (2006.01)
(Continued)

(52) U.S. Cl.
CPC .......... *G07F 17/322* (2013.01); *A63F 13/211* (2014.09); *A63F 13/213* (2014.09);
(Continued)

(58) Field of Classification Search
None
See application file for complete search history.

(56) References Cited

U.S. PATENT DOCUMENTS 6,102,394 A   8/2000   Wurz et al.
6,638,166 B2  10/2003  Hedrick et al.
(Continued)

FOREIGN PATENT DOCUMENTS

EP   1890308 A1   2/2008
WO   0074092 A1   12/2000

OTHER PUBLICATIONS http://www.novomatic.com/en/products/gaming/cabinets/fa880-novostar-vip-royal.

*Primary Examiner* — Seng Heng Lim
(74) *Attorney, Agent, or Firm* — Grant A. Dingledine; David J. Bremer (57) ABSTRACT

A visually uniform multi-level, multi-sectioned deck for a gaming machine player interface is disclosed. Sections of the interface are configured with modular panel assemblies having corresponding sets of electronic components. The panel assemblies may be exchanged to customize and flexibly configure the player interface. The deck includes partitions housing individual modular panel assemblies engaged via mated fastener components, shielding visibility of the installed electronic components from the player position until activated. A plurality of the modular panel assemblies, each having distinct and functional sets of electronic components, are available for engagement in each of the partitions of the deck. The assembled deck comprising a plurality of interchangeable modular panel assemblies, each having distinct and functional sets of electronic components, provides a configurable player interface having spatially segregated and demarked functional areas that appear uniform from the player position until activated.

20 Claims, 7 Drawing Sheets

(51) Int. Cl.
  *A63F 13/214* (2014.01)
  *A63F 13/28* (2014.01)
  *A63F 13/213* (2014.01)
  *A63F 13/215* (2014.01)
  *A63F 13/24* (2014.01)
  *A63F 13/211* (2014.01)

(52) U.S. Cl.
  CPC .......... *A63F 13/214* (2014.09); *A63F 13/215* (2014.09); *A63F 13/24* (2014.09); *A63F 13/28* (2014.09); *G07F 17/3209* (2013.01); *G07F 17/3211* (2013.01)

(56) References Cited

U.S. PATENT DOCUMENTS

| | | | |
|---|---|---|---|
| D561,268 S | 2/2008 | Myers | |
| 7,374,491 B1 | 5/2008 | Johnson | |
| 7,611,408 B2 | 11/2009 | Martin et al. | |
| 7,628,701 B2 | 12/2009 | Wells | |
| D622,782 S | 8/2010 | Chudek et al. | |
| 7,892,096 B2 | 2/2011 | Rigsby et al. | |
| 7,955,176 B2* | 6/2011 | Tastad | G07F 17/32 312/334.44 |
| 8,096,884 B2 | 1/2012 | Beadell et al. | |
| 8,147,340 B2 | 4/2012 | Brunet de Courssou et al. | |
| 8,177,637 B2 | 5/2012 | Beadell et al. | |
| 8,226,475 B2 | 7/2012 | Trobia | |
| 8,235,789 B2 | 8/2012 | Rasmussen | |
| 8,262,480 B2 | 9/2012 | Cohen et al. | |
| 8,337,314 B2 | 12/2012 | Waxman et al. | |
| 8,366,541 B2 | 2/2013 | Luciano, Jr. et al. | |
| 8,366,555 B2 | 2/2013 | McGahn et al. | |
| 8,469,800 B2 | 6/2013 | LeMay et al. | |
| 8,613,656 B2 | 12/2013 | Wudtke et al. | |
| 8,657,666 B2 | 2/2014 | Wudtke et al. | |
| 8,663,009 B1 | 3/2014 | Pacey et al. | |
| 8,702,497 B2 | 4/2014 | Chudek et al. | |
| 8,758,128 B2 | 6/2014 | Prins et al. | |
| 8,858,342 B2 | 10/2014 | Waxman et al. | |
| 8,951,121 B2 | 2/2015 | Lyons et al. | |
| 8,956,222 B2 | 2/2015 | LeMay et al. | |
| 9,336,962 B2 | 5/2016 | Wudtke et al. | |
| 9,349,240 B2 | 5/2016 | Castro et al. | |
| 9,367,985 B2 | 6/2016 | Dempsey et al. | |
| D760,846 S | 7/2016 | Castro et al. | |
| 2004/0004112 A1* | 1/2004 | Petruccelli | A63F 13/08 235/375 |
| 2004/0018877 A1* | 1/2004 | Tastad | G07F 17/32 463/46 |
| 2005/0054449 A1* | 3/2005 | Kopera | G07F 17/32 463/46 |
| 2005/0113163 A1* | 5/2005 | Mattice | G06F 3/03547 463/16 |
| 2005/0192101 A1* | 9/2005 | Businger | E05B 1/003 463/46 |
| 2007/0045959 A1 | 3/2007 | Soltys | |
| 2009/0124337 A1 | 5/2009 | Lyons et al. | |
| 2009/0176573 A1 | 7/2009 | Dreyer | |
| 2010/0178989 A1* | 7/2010 | Kuhn | A63F 1/06 463/46 |
| 2010/0298056 A1* | 11/2010 | Gawel | G06F 1/181 463/46 |
| 2012/0111706 A1 | 5/2012 | Seckel et al. | |
| 2014/0274372 A1 | 9/2014 | Rosander | |

\* cited by examiner

MULTI-ZONE PLAYER INTERFACE DECK FOR A GAMING MACHINE

RELATED APPLICATIONS

This patent application claims the benefit of priority to U.S. Provisional Patent Application Ser. No. 62/394,424 filed on 14 Sep. 2016 and entitled "MULTI-ZONE PLAYER INTERFACE DECK FOR A GAMING MACHINE," the contents of which are hereby incorporated by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. Copyright 2017, Bally Gaming, Inc.

FIELD OF THE INVENTION

This invention pertains generally to a player interface for a gaming machine. More particularly, this invention relates to a standardized and visually uniform multi-level, multi-sectioned deck component of a gaming machine, the deck comprising various modular assemblies having electronic components providing flexibility of design and function.

BACKGROUND

Gaming machines use various interfaces to present information and receive input from players and observers. Accordingly, there is a need for an aesthetic player interface having the combination of an appealing form and variably customizable functions and features. The present invention satisfies these needs, as well as others, and generally overcomes the deficiencies found in the background art.

BRIEF DESCRIPTION OF THE INVENTION

A standardized and visually uniform multi-level, multi-sectioned deck for a gaming machine is described, the deck positioned to enable interaction with one or more players at a player position of the gaming machine. The deck provides a uniform visual appearance with exchangeable modular electronic components allowing flexibility in design and function. The deck includes partitions that house modular panel assemblies having associated electronic components that are exchangeable in a modular fashion. In one embodiment, the overall appearance of the deck is not altered by the exchange of various panel assemblies until any corresponding electronic components are operating and activated.

In accordance with one embodiment of the invention, a deck enabling a player at a player position to interface with a gaming machine is disclosed. The deck comprises a deck frame and a plurality of modular panel assemblies including a first modular panel assembly and a second modular panel assembly. Each of the plurality of modular panel assembly includes a face plate, a set of electronic components, and a panel assembly fastener. The face plate has opposing top and bottom surfaces, wherein the top surface is exposed to the player position. The set of electronic components are disposed beneath and mounted to the bottom surface of the face plate and are electrically coupled to the gaming machine. The deck frame has a plurality of discrete partitions, each having a partition fastener and a compartment. The partition fastener engages the panel assembly fastener of a corresponding modular panel assembly and the compartment conceals the corresponding set of electronic components beneath its face plate. The first and second modular panel assemblies are interchangeable for at least one of the partitions. is between the, and wherein until activation of the corresponding set of electronic components, the face plates of the respective first and second modular panel assemblies are indistinguishable when viewed from the player position.

In accordance with another embodiment of the invention, a gaming system is disclosed. The gaming system comprises a gaming machine and game-logic circuitry configured to present a casino wagering game on the gaming machine. The gaming machine includes a player-interface deck enabling a player at a player position to interface with the gaming machine. The player-interface deck comprises a frame and a plurality of modular panel assemblies including a first modular panel assembly and a second modular panel assembly. Each of the plurality of modular panel assemblies includes a face plate, a set of electronic components, and a panel assembly fastener. Each face plate has a top surface exposed to the player position and an opposing bottom surface. The set of electronic components are disposed beneath and mounted to the bottom surface of the face plate and electrically coupled to the gaming machine. The frame has a plurality of discrete partitions, each including a partition fastener and a compartment. The partition fastener engages the panel assembly fastener of a corresponding modular panel assembly and the compartment conceals the corresponding set of electronic components beneath its face plate. The first and second modular panel assemblies are interchangeable as the engaged modular panel assembly, wherein the face plates of the respective first and second modular panel assemblies are indistinguishable when viewed from the player position until activation of the corresponding set of electronic components.

In accordance with another embodiment of the invention, a method for modifying a gaming machine deck enabling a player at a player position to interface with the gaming machine is described. A first modular panel assembly is installed into a frame partition of the deck. The first modular panel assembly includes a first face plate, a first set of electronic components, and a first panel assembly fastener. The first face plate has a top surface exposed to the player position, and a bottom surface. The first set of electronic components are disposed beneath and mounted to the bottom surface of the first face plate. The frame partition includes a compartment and a partition fastener. The compartment conceals the first set of electronic components beneath the first face plate and the partition fastener engages the first panel assembly fastener. The first modular panel assembly is removed from the frame partition. A second modular panel assembly is installed into the frame partition. The second modular panel assembly includes a second face plate, a second set of electronic components, and a second panel assembly fastener. The second set of electronic components has differing functionality from the first set of electronic components. The second face plate has a top surface and a bottom surface. The top surface is exposed to the player position, and the second set of electronic components are mounted to and disposed beneath the bottom surface of the second face plate and electrically coupled to the gaming machine. The compartment conceals the second set of electronic components beneath the second face plate and the partition fastener engages the second panel assembly fastener. The first and second face plates and the functionality of the respective first and second modular panel assemblies are indistinguishable when viewed from the player position until activation of the first or second set of electronic components of the respective installed modular panel assembly.

Further advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 1A:
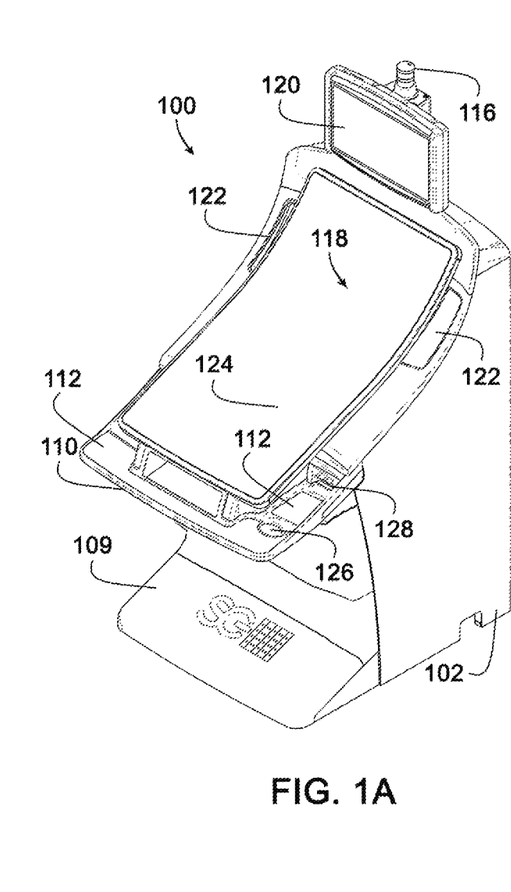
FIGS. 1A-1C are isometric views of a free-standing gaming machine according to an embodiment of the present invention.
Figure 1B:
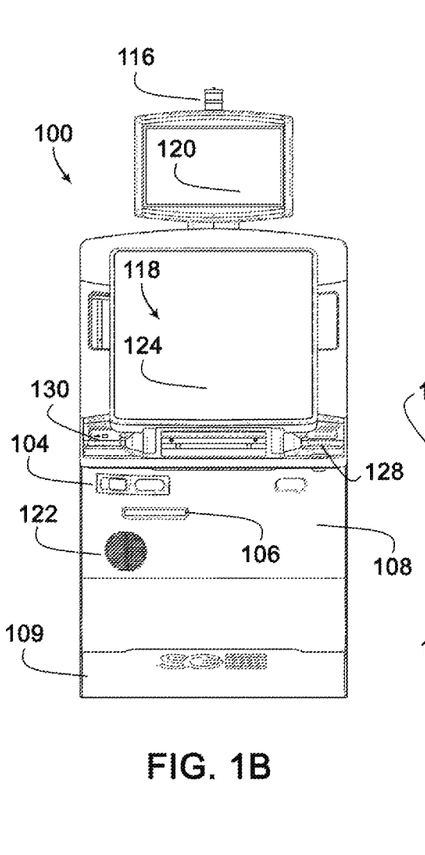
Figure 1C:
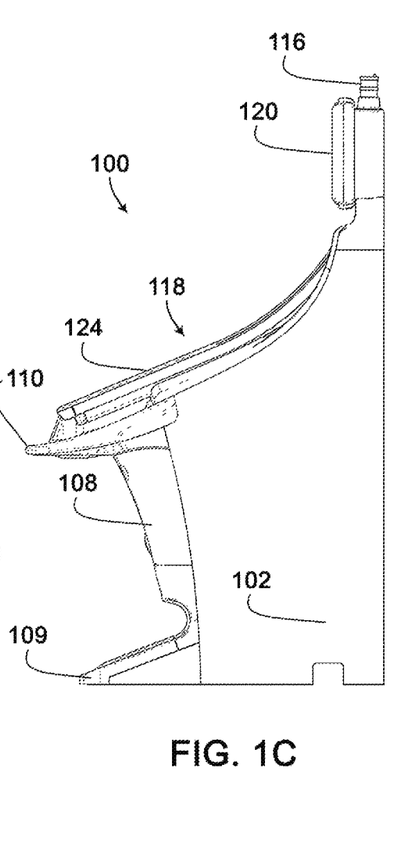

Referring to FIGS. 1A-1C, there is shown a gaming machine 100 similar to those operated in gaming establishments (e.g., casinos) in one embodiment. With regard to the present invention, the gaming machine 100 may be any type of gaming terminal or machine and may have varying structures and methods of operation. For example, in some aspects, the gaming machine 100 is an electromechanical gaming terminal configured to play mechanical slots, whereas in other aspects, the gaming machine 100 is an electronic gaming terminal configured to play a video casino game, such as slots, keno, poker, blackjack, roulette, craps, etc. In other embodiments, the gaming machine 100 is used by a retailer or a consumer to obtain or generate lottery tickets or other wagering coupons. Further, the gaming machine 100 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

In one embodiment, the gaming machine 100 comprises a gaming cabinet 102 that securely houses various input devices, output devices, input/output devices, internal electronic/electromechanical components, and connective wiring. The cabinet 102 includes exterior walls, interior walls, and shelves for mounting the internal components and managing the wiring.

The cabinet 102 includes one or more latches 104 fastening and securing one or more front doors 108 in place to enable access to the internal components, a window viewing port 106 for inspecting one or more physical or electronic meters on the interior of the cabinet 102, and a foot plate 109. The latch 104 may require a physical or electronic key to gain access to the interior compartment of the cabinet 102 behind the locked door 108. The cabinet 102 also houses a securely fashioned multi-level, multi-zoned player interface deck 110. The deck 110 includes a plurality of modular sections. Each modular section of the deck 110 has an installed panel assembly with a corresponding face plate 112 exposed to the player position. The panel assembly is engaged in a defined partition of the deck. Each face plate 112 shields internal electronic components of the panel assembly. The electronic components may be electrically coupled to the gaming machine (e.g., game-logic circuitry) or may operate independently from the game-logic circuitry.

Various input devices, output devices, and input/output devices are disposed on, and are securely coupled to, the cabinet 102 and/or the deck 110. By way of example, the output devices include a primary display 118, a secondary display 120, and one or more audio speakers 122. The primary display 118 or the secondary display 120 may be a mechanical-reel or mechanical-wheel display device, a video display device, or a combination thereof in which a transmissive video display is disposed in front of the mechanical display device to portray a video image superimposed upon the mechanical-reel or mechanical-wheel display. The primary and/or secondary displays 118, 120 variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 100. The gaming machine 100 includes touch screen(s) 124 mounted over the primary and/or secondary displays, one or more buttons 126 positioned on a button panel or part of the deck 110, a physical item device 128 (e.g., a bill/ticket/card reader/writer/acceptor/dispenser), and one or more player-accessible ports 130 (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The cabinet 102 also includes a notification mechanism 116, such as a candle or tower light, mounted to the top of the secondary display 120 (or, alternatively, the cabinet 102). The notification mechanism 116 flashes to alert an attendant that change is needed, a hand pay is requested, or there is a potential problem with the gaming machine 100.

The player input devices, such as the touch screen 124, buttons 126, a mouse, a joystick, a rollerball, rotatable dial, a gesture-sensing device, a voice-recognition device, a virtual-input device, etc., accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 100 includes one or more value input payment devices and value output pay out devices, for example, the physical item device 128. In order to deposit cash or credits onto the gaming machine 100, the value input devices are configured to detect a physical item associated with a monetary value that establishes a credit balance on a credit meter such as the "credits" meter 184 (see FIG. 3). The physical item may, for example, be currency bills, coins, tickets, vouchers, coupons, cards, and/or computer-readable storage mediums. The deposited cash or credits are used to fund wagers placed on the wagering game played via the gaming machine 100. Examples of value input devices include, but are not limited to the input/output device 128 that may include one or more of a coin acceptor, a bill/ticket acceptor, a card reader/writer, a wireless communication interface for reading cash or credit data from a nearby mobile device, and a network interface for withdrawing cash or credits from a remote account via an electronic funds transfer. In response to a cashout input that initiates a pay out from the credit balance indicated on the "credits" meter 184 (see FIG. 3), the value output devices are used to dispense cash or credits from the gaming machine 100. The credits may be exchanged for cash at, for example, a cashier or redemption station. Examples of value output devices include, but are not limited to, a coin hopper for dispensing coins or tokens, a bill dispenser, a card reader/writer, a ticket dispenser for printing tickets redeemable for cash or credits, a wireless communication interface for transmitting cash or credit data to a nearby mobile device, and a network interface for depositing cash or credits to a remote account via an electronic funds transfer.

Figure 2:
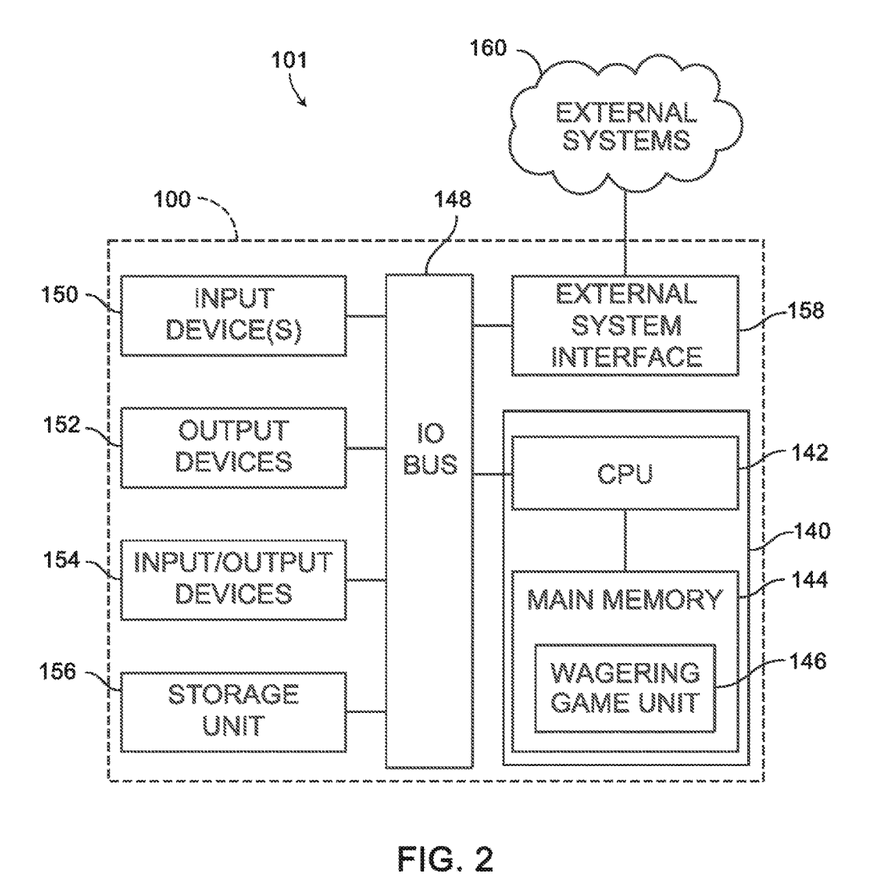
FIG. 2 is a schematic view of a gaming system according to an embodiment of the present invention.

Referring now to FIG. 2, there is shown a block diagram of a gaming-machine architecture 101 including the gaming machine 100 in one embodiment. The gaming machine 100 includes game-logic circuitry 140 securely housed within a locked box internal to the gaming cabinet 102 (see FIG. 1). The game-logic circuitry 140 includes a central processing unit (CPU) 142 connected to a main memory 144 that comprises one or more memory devices. The CPU 142 includes any suitable processor(s), such as those made by Intel and AMD. By way of example, the CPU 142 includes a plurality of microprocessors including a master processor, a slave processor, and a secondary or parallel processor. Game-logic circuitry 140, as used herein, comprises any combination of hardware, software, or firmware disposed in or outside of the gaming machine 100 that is configured to communicate with or control the transfer of data between the gaming machine 100 and a bus, another computer, processor, device, service, or network. The game-logic circuitry 140, and more specifically the CPU 142, comprises one or more controllers or processors and such one or more controllers or processors need not be disposed proximal to one another and may be located in different devices or in different locations. The game-logic circuitry 140, and more specifically the main memory 144, comprises one or more memory devices which need not be disposed proximal to one another and may be located in different devices or in different locations. The game-logic circuitry 140 is operable to execute all of the various gaming methods and other processes disclosed herein. The main memory 144 includes a wagering-game unit 146. In one embodiment, the wagering-game unit 146 causes wagering games to be presented, such as video poker, video blackjack, video slots, video lottery, etc., in whole or part.

The game-logic circuitry 140 is also connected to an input/output (I/O) bus 148, which can include any suitable bus technologies, such as an AGTL+ frontside bus and a PCI backside bus. The I/O bus 148 is connected to various input devices 150, output devices 152, and input/output devices 154 such as those discussed above in connection with FIG. 1. The I/O bus 148 is also connected to a storage unit 156 and an external-system interface 158, which is connected to external system(s) 160 (e.g., wagering-game networks).

The external system 160 includes, in various aspects, a gaming network, other gaming machines or terminals, a gaming server, a remote controller, communications hardware, or a variety of other interfaced systems or components, in any combination. In yet other aspects, the external system 160 comprises a player's portable electronic device (e.g., cellular phone, electronic wallet, etc.) and the external-system interface 158 is configured to facilitate wireless communication and data transfer between the portable electronic device and the gaming machine 100, such as by a near-field communication path operating via magnetic-field induction or a frequency-hopping spread spectrum RF signals (e.g., Bluetooth, etc.).

The gaming machine 100 optionally communicates with the external system 160 such that the gaming machine 100 operates as a thin, thick, or intermediate client. The game-logic circuitry 140—whether located within ("thick client"), external to ("thin client"), or distributed both within and external to ("intermediate client") the gaming machine 100—is utilized to provide a wagering game on the gaming machine 100. In general, the main memory 144 stores programming for a random number generator (RNG), game-outcome logic, and game assets (e.g., art, sound, etc.)—all of which obtained regulatory approval from a gaming control board or commission and are verified by a trusted authentication program in the main memory 144 prior to game execution. The authentication program generates a live authentication code (e.g., digital signature or hash) from the memory contents and compare it to a trusted code stored in the main memory 144. If the codes match, authentication is deemed a success and the game is permitted to execute. If, however, the codes do not match, authentication is deemed a failure that must be corrected prior to game execution. Without this predictable and repeatable authentication, the gaming machine 100, external system 160, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 142 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 142 when executing the game-outcome logic to determine a resultant outcome for that instance of the wagering game. The resultant outcome is then presented to a player of the gaming machine 100 by accessing the associated game assets, required for the resultant outcome, from the main memory 144. The CPU 142 causes the game assets to be presented to the player as outputs from the gaming machine 100 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The gaming machine 100 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 100 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
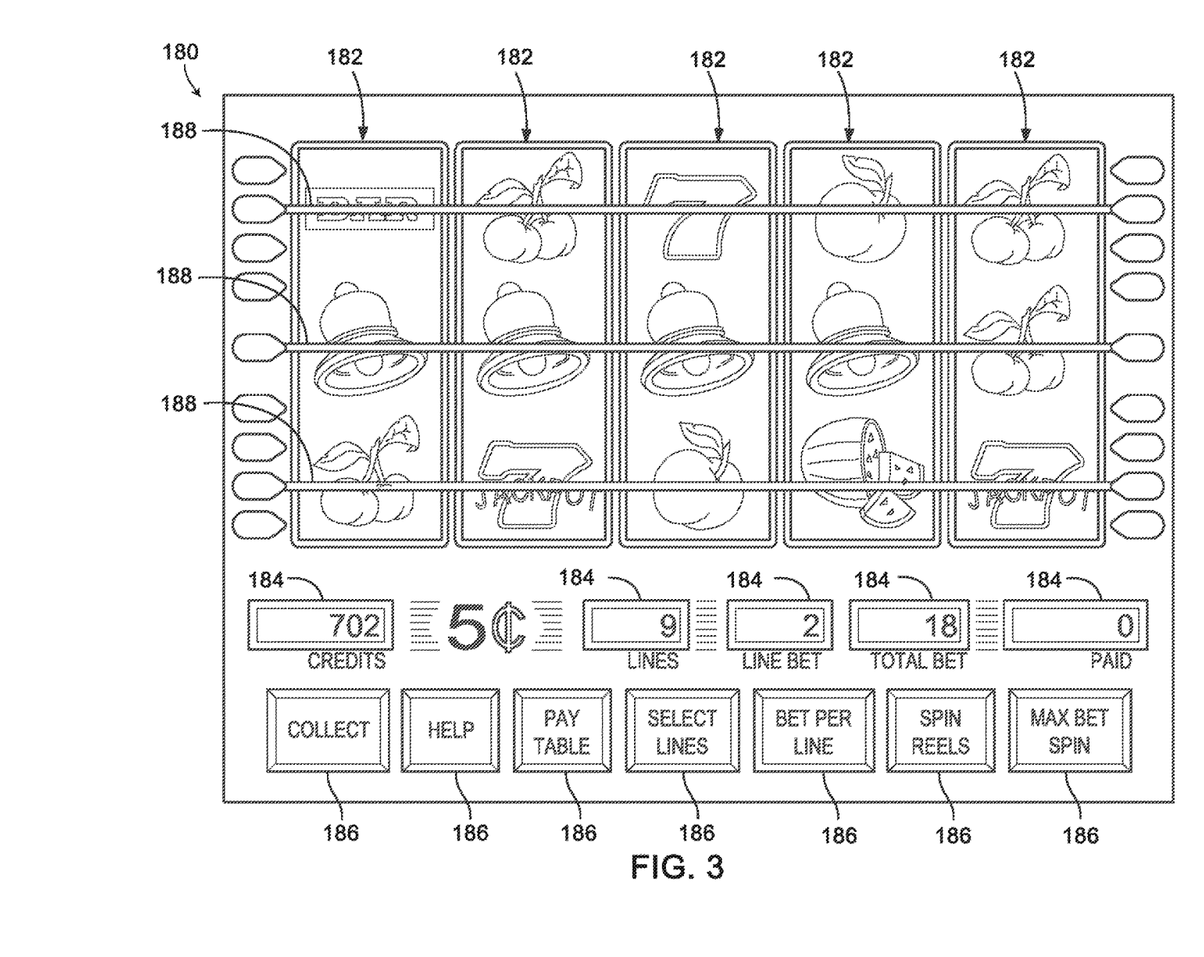
FIG. 3 is an image of an exemplary basic-game screen of a wagering game displayed on a gaming machine, according to an embodiment of the present invention.

Referring now to FIG. 3, there is illustrated an image of a basic-game screen 80 adapted to be displayed on the primary display 118 or the secondary display 120 in one embodiment. The basic-game screen 180 portrays a plurality of simulated symbol-bearing reels 182. Alternatively or additionally, the basic-game screen 180 portrays a plurality of mechanical reels or other video or mechanical presentation consistent with the game format and theme. The basic-game screen 180 also advantageously displays one or more game-session credit meters 184 and various touch screen buttons 186 adapted to be actuated by a player. A player can operate or interact with the wagering game using these touch screen buttons or other input devices such as the button 126 shown in FIG. 1. The game-logic circuitry 140 operates to execute a wagering-game program causing the primary display 118 or the secondary display 120 to display the wagering game.

In response to receiving an input indicative of a wager covered by or deducted from the credit balance on the "credits" meter 184, the reels 182 are rotated and stopped to place symbols on the reels in visual association with paylines such as paylines 188. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 100 depicted in FIG. 1, following receipt of an input from the player to initiate a wagering-game instance. The gaming machine 100 then communicates the wagering-game outcome to the player via one or more output devices (e.g., primary display 118 or secondary display 120) through the display of information such as, but not limited to, text, graphics, static images, moving images, etc., or any combination thereof. In accord with the method of conducting the wagering game, the game-logic circuitry 140 transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry 140 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 142 causes the recording of a digital representation of the wager in one or more storage media (e.g., storage unit 156), the CPU 142, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 142 (e.g., the wager in the present example). As another example, the CPU 142 further, in accord with the execution of the stored instructions relating to the wagering game, causes the primary display 118, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 140 to determine the outcome of the wagering-game instance. In at least some aspects, the game-logic circuitry 140 is configured to determine an outcome of the wagering-game instance at least partially in response to the random parameter.

In one embodiment, the gaming machine 100 and, additionally or alternatively, the external system 160 (e.g., a gaming server), means gaming equipment that meets the hardware and software requirements for fairness, security, and predictability as established by at least one state's gaming control board or commission. Prior to commercial deployment, the gaming machine 100, the external system 160, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 100 may be implemented with hardware and software architectures, circuitry, and other special features that differentiate it from general-purpose computers (e.g., desktop PCs, laptops, and tablets).

Figure 4A:
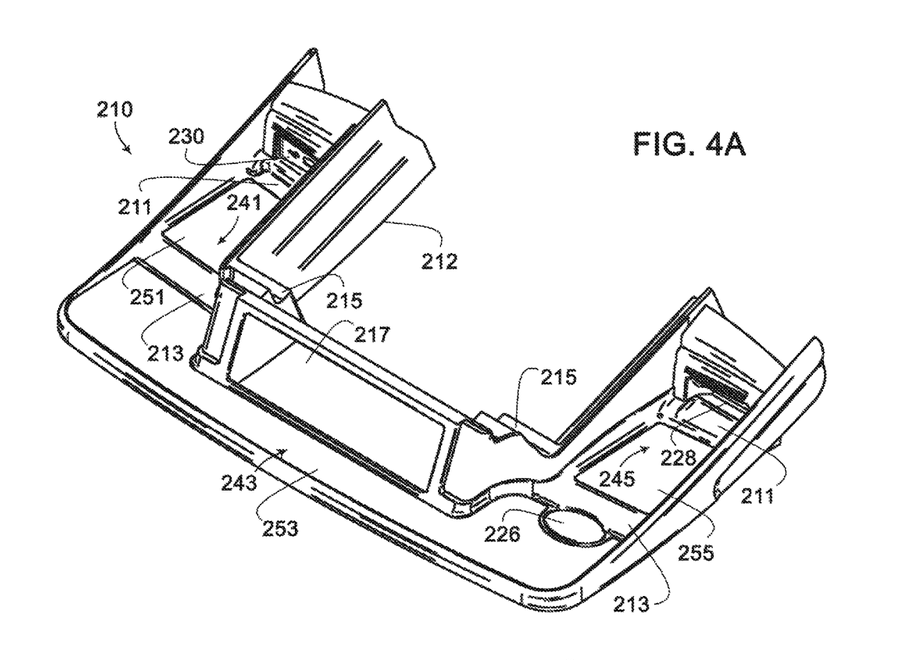
FIGS. 4A-4B are isometric views of a player interface deck for a gaming machine according to an embodiment of the present invention.
Figure 4B:
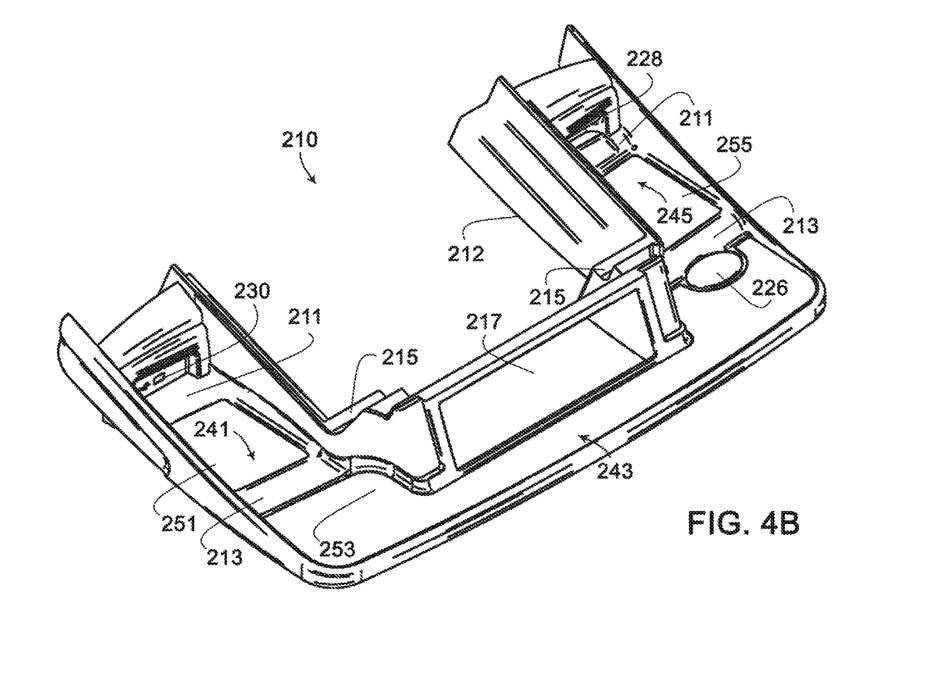

Referring now to FIGS. 4A-4B, there is illustrated an image of differing isometric depictions of a gaming machine deck 210 used as a component in a player interface in a gaming machine in one embodiment. The deck 210 comprises a deck frame 212 that is cast or formed from one or more rigid materials such as metal or plastic. The deck 212 defines a set of partitions (potentially varying in shape, size, and volume), each engaging and securing a corresponding modular panel assembly 241, 243, 245.

The partitions of the deck 210 housing the modular panel assemblies 241, 243, 245 serve to segregate areas by function and position of the corresponding face plates 251, 253, 255 by spatially creating functional demarcation areas. That is, specific areas are visibly segregated by physically separating the deck 210 into individual zones and separate components utilizing a corresponding "glass cover" face plate. This modular approach has several features and provides many benefits including a harmonized approach to a player interface that is durable, easy to clean, and allows for unique effects and specific features in identifiable regions of the player interface. Examples include combinations of inconspicuous and discernable regions for inductive charging for mobile devices, audio and video presentation with or without touch interaction, and lighting effects for specific features with or without printed graphics (e.g., for presenting informational text or other communications). In one embodiment, amenities for gaming machines and player interfaces may include inductive charging with informative graphics and player feedback indicators (e.g., green light/flashing battery icon during proximity charging) when a mobile device is charging directly on the surface (e.g., panel assembly faceplate) of the player interface. Specific positioning and elevation of the separate features and functions can provide intuitive visual cues to the player indicating what the features are, how to use them, whether the features are available/activated, and how to obtain them.

Depending upon the embodiment, the partitions of the deck frame 212 may or may not be symmetrically positioned in the deck 210. Each partition of the deck 210 includes a suitable partitioned compartment for housing a removable modular panel assembly 241, 243, 245 with an exposed face plate 251, 253, 255 concealing a set of electronic components therein. Each modular panel assembly 241, 243, 245 is independently configurable from all others. Any modular panel assemblies having a common face plate footprint will appear identical to the player when viewing the gaming machine deck 210 regardless of any associated sets of electronic components. In one embodiment, multiple modular panel assemblies are interchangeable for a given partition and are indistinguishable when viewed from the player position until one or more sets of electronic components are activated.

Once a modular panel assembly 241, 243, 245 is engaged (installed and secured) into a partition, a set of corresponding electronic components are electrically coupled to the gaming machine, thereby interfacing with the game-logic circuitry 140 or additional managing electronics. Differing panel assemblies with the same face plate footprint may have differing sets of electronic components performing different functions when activated. Specific indicia may be used to indicate the functionality of a particular set of electronics when activated. For example, viewing a face plate of a respective modular panel assembly from the player position may indicate functionality performed by a corresponding set of electronic components during activation.

The frame 212 may include one or more modular panel assemblies 241, 243, 245 having a "dead front" appearance when powered off or deactivated (i.e., the entire surface appears black until one or more partitions and face plates in sections of the deck interface are activated and back-lit). The panel assemblies 241, 243, 245 may additionally include backlighting as part of their associated electronic components, wherein visible sections of the frame 212 contrast with transparent or translucent emission of light or imagery through the face plates 251, 253, 255. In one embodiment, electronics may further activate and deactivate other visual indicators of the player interface or gaming machine 100 separate from the panel assemblies 241, 243, 245 of the deck 210.

In one embodiment, the face plate 251 and the face plate 255 have a common footprint (i.e., identical face plate shapes), but the shape of the housing partitions may be significantly different in order to accommodate structurally and functionally diverse electronic components of the corresponding modular panel assemblies 241, 245. That is, while the face plates 251, 255 share a common footprint and external appearance from the player position appears identical, the corresponding partitions may differ in shape and size. Further, a set of modular panel assemblies may be available for placement into a particular partition that include indistinguishable face plates when viewed from the player position (see FIG. 6). Each of the set of common-face plate modular panel assemblies may differ significantly in electronic components and associated functionality, yet will appear identical from the player position.

As an example, an associated set of modular panel assemblies sharing the same footprint as the face plate 251 may be separately engaged (e.g., fastened and secured) into the partition housing the modular panel assembly 241 (provided accommodating space). Each modular panel assembly has a corresponding set of electronic components having distinct functionality and each modular panel assembly are indistinguishable when viewed from the player position when engaged (installed). That is, the modular panel assembly 241 chosen from the set of modular panel assemblies may be installed into a deck partition without a having a visible/detectable indication from the player position until activation of the associated electronic components. In one embodiment, once activated, an installed modular panel assembly 241 indicates functionality of the electronic components (e.g., wireless charging, motion detection, etc.) using light diffused through the face plate 251 (e.g., from a LED).

In one embodiment, each side of the frame 212 includes an upper sloped section 211 and a lower sloped section 213, transitioning between adjacent partitions positioned at different elevations and at different distances from the player position. In different embodiments, the shape and form of the sloped transitions may be significantly different to accommodate differences in elevation and distance of adjacent partitions from the player position. An enhanced view of the upper sloped section 211 and lower sloped section 213 can be seen in FIGS. 5A-5C.

In one embodiment, the frame 212 may include one or more interior surfaces supporting portions of a mounted display device (e.g., primary display 118) and/or other elements of the gaming machine 100. A set of retaining lips 215 support a lower section of the mounted display device to provide structural integrity. The frame 212 may also include a centralized recess 217 for exposing a storage area for player items (e.g., glasses, mobile device, drink, etc.) or housing and presenting a panel with a customized graphic (e.g., casino or manufacturer logo), an internally mounted liquid crystal display (LCD), a light-emitting diode (LED) display, a corresponding face plate, or any combination of these. A button 226 may be positioned in the deck 210 (e.g., to initiate a wagering game), in addition to a slot 228 for access to one or more physical item devices (e.g., a bill/ticket/card reader/writer/acceptor/dispenser) and a slot 230 for access to a player-accessible port (e.g., audio output jack for headphones, video headset jack, USB port, wireless transmitter/receiver, etc.). The deck 210 includes multiple levels collectively serving as at least a portion of the player interface for the gaming machine 100.

In other embodiments, the button 226 (and/or an additional input device) is installed to project through the face plate 253 to allow interaction from the player position via the panel assembly 243. Other input devices may be integrated with or separate from the modular panel assembly 243. Input devices may include an actuating button, a set of buttons, a joystick, a trackball, a pointing device, a rotatable dial, a touch-detection device, a pull handle, an infrared (IR) motion sensor, a camera, and a microphone, among others. For example, input devices may be mounted under the face plate 253 of the modular panel assembly 243 and may even remain undetectable/invisible during operation.

The set of electronic components of a modular panel assembly may be adhesively mounted to the underside of the corresponding face plate and remain completely shielded from view from the player position when installed. The electronic components may be mounted directly to the face plate (e.g., via adhesive) or be otherwise contained within a modular frame or panel assembly that is integrated with a face plate prior to insertion and engagement. A light pipe may also be positioned between the electronic components and the face plate to selectively deliver light generated by the electronic components through the faceplate only in specific regions. In one embodiment, the external surface of a face plate provides flush mounting minimizing gaps when installed. A face plate may have a first surface configured for exposure to the player position and a second surface configured for mounting and/or shielding of corresponding electronic components that is inaccessible from the player position.

Figures 7A, 7B, 7C:
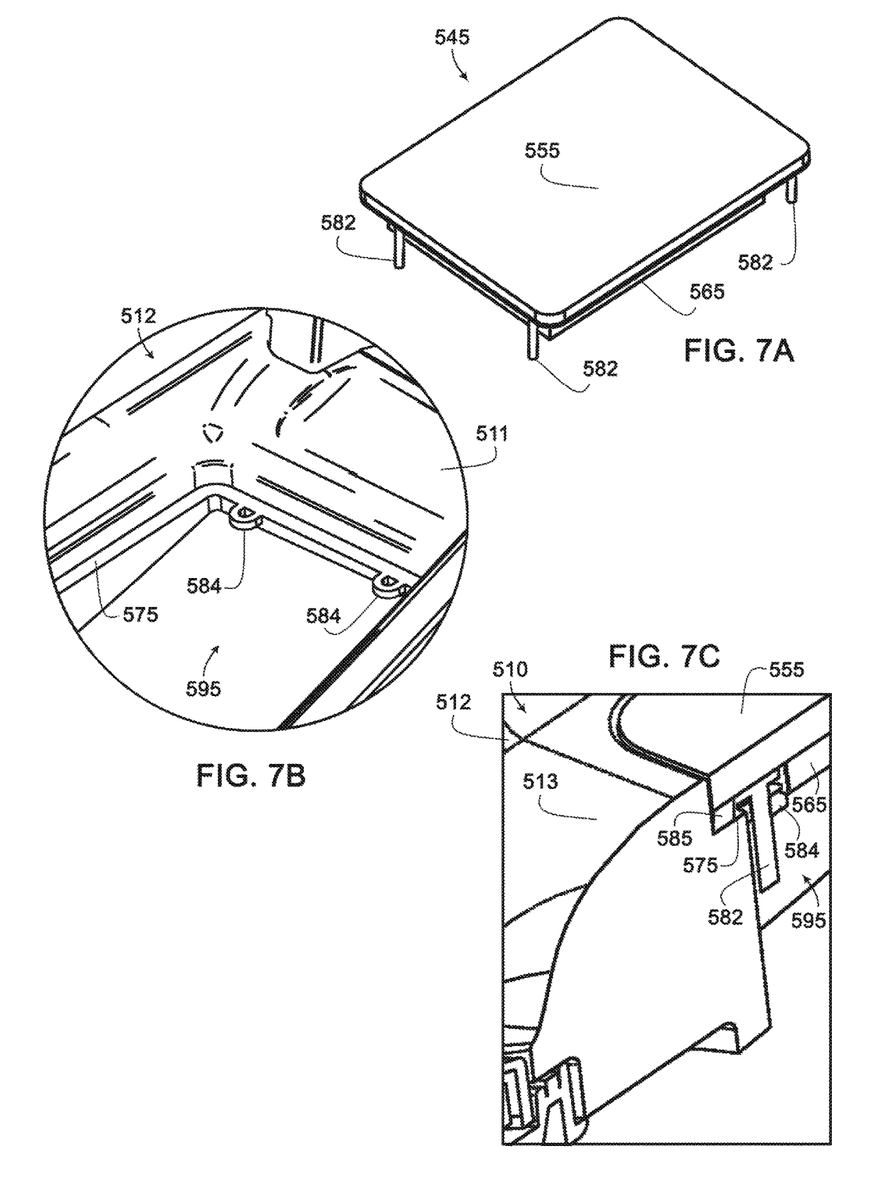
FIG. 7A is an isometric view of a modular panel assembly for a player interface deck highlighting fastening mechanisms according to an embodiment of the present invention.
FIG. 7B is an exploded isometric view of a section of a deck frame partition of a player interface deck highlighting fastening mechanisms according to an embodiment of the present invention.
FIG. 7C is an isometric view of a modular panel assembly for a player interface deck revealing a cross section showing internal structure of the modular panel assembly and highlighting fastening mechanisms according to an embodiment of the present invention.

Each modular panel assembly 241, 243, 245 may be secured to a matching partition of the deck frame 212 in a number of ways. For example, engagement and fastening may occur using holes and matching pairs of threaded posts and nuts, non-threaded posts and compression collets, sleeves, retaining clips, etc., hook/snap door fasteners, or any other suitable latching/securing mechanism capable of holding the modular panel assembly 241, 243, 245 in place in the deck frame 212. A gasket may be used to seal a face plate of a panel assembly to the frame to inhibit liquids or gas from passing into the gaming machine (thereby protecting the underlying electronic components). Access to the securing mechanism components of the panel assemblies may occur from the interior of the gaming machine to secure or loosen each panel assembly. One example of a mated fastening component pairing is shown in FIG. 7A-7C, but any type of fastening mechanism may be employed to secure the modular panel assemblies 241, 243, 245 to the frame 212.

Figures 5A, 5B, 5C:
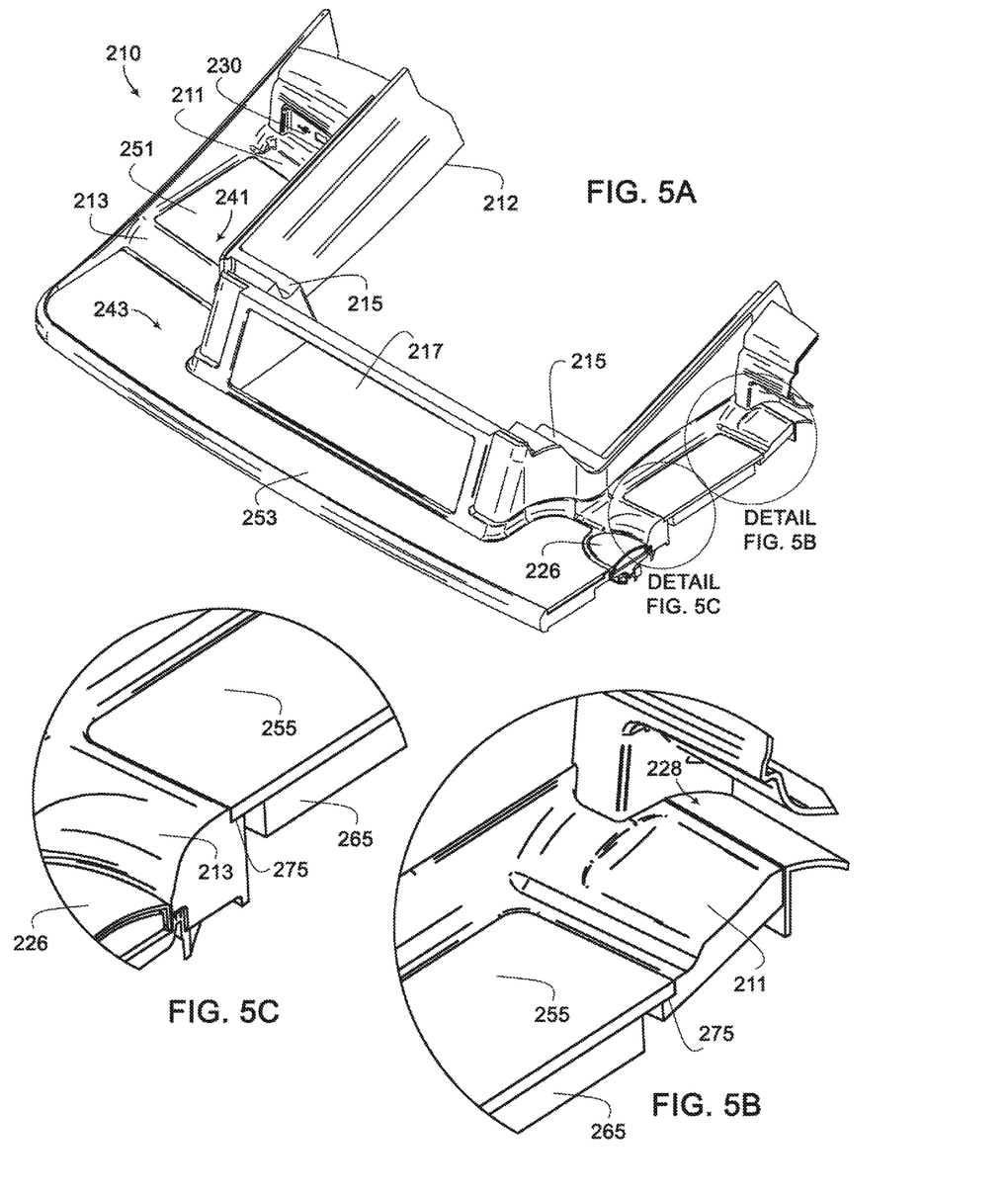
FIG. 5A is an isometric view of the player interface deck in FIG. 4A revealing a cross-section showing internal structure of the deck according to an embodiment of the present invention.
FIGS. 5B-5C are enhanced views of portions of the player interface deck shown in FIG. 5A, according to an embodiment of the present invention.

Referring now to FIGS. 5A-5C, a set of isometric views with a cross-section exposing the internal structure of many components on one side of the deck 210 is shown in one embodiment. The deck 210 includes an upper sloped section 211 providing a smooth sloping transition from the slot 228 (providing access to a physical item device) to the face plate 255 of the modular panel assembly 245. Likewise, the lower sloped section 213 provides a smooth curving transition between one edge of the face plate 255 of modular panel assembly 245 positioned at a differing elevation and distance from the player position where the button 226 resides. The lower surface of the face plate 255 rests upon a retaining lip 275 of the partition when the modular panel assembly 245 is inserted and securely engaged. The face plate 255 and the retaining lip 275 may also include a gasket (not shown) to prevent the passage of liquid or gas.

The modular panel assembly 245 includes a set of electronic components 265. In one embodiment, the electronic components 265 are adhesively affixed directly to the face plate 255. The face plate of a modular panel assembly may comprise one or more materials transmitting light to the player position from associated electronic components. Any combination of optically translucent materials may be used, including glass, acrylics, plastics, ceramics, etc., and any combination of electronic components may be used to generate the light via a simple light source (LED). The electronic components may also perform additional functional operations in combination with visual components (e.g., illumination/animation via LED/OLED matrices), a modular panel assembly may provide ambient lighting, inductive powering of proximate devices, touchscreen input, gesture-based input detection, etc. Audio components may also be incorporated for sound projection in addition to other components providing functions such as wireless inductive charging, Wi-Fi signal exchange, etc.

In another embodiment, the electronic components 265 may include a light pipe (not shown) positioned between a light source and the face plate 255 to deliver or direct light to the underside of the face plate 255 for diffusion to the player position. A light pipe may be accompanied by a lighting mask that limits diffusion of light to specific regions of the face plate 255. For example, by using a light mask having an opaque light-blocking pattern between the underside of the face plate 255 and a uniform light source of the electronic components 265, light can be provided in a specific pattern through the face plate 255 (e.g., an arrow indicating the presence of the slot 228 to show a player where to insert bills or vouchers). Lighting elements and light pipes that may be used in the electronic components 265 are commercially available from a variety of sources, including OMRON ELECTRONICS LLC, 2895 Greenspoint Parkway, Suite 200, Hoffman Estates, Ill. 60169.

In one embodiment, the material of the face plate 255 does not interfere with the operation of the electronic components 265 and surfaces exposed to the player position are preferably resistant to impact, scratching, scoring, and liquid penetration such that cleaning may occur easily without sustaining damage or marking. One or more transparent or translucent coatings on the face plate may additionally protect the underlying material from damage or exposure.

The difference in visual indications of adjacent panels may be selectively controlled to reflect differences in states of individual sets of electronic components and the gaming machine as a whole during activation of the electronic components. Indicia or graphics may be used to indicate functionality, machine states, manufacturer, supplier, etc., on the face plate of the modular panel assembly (e.g., a sticker or surface engraving) or integrated into the modular panel assembly (e.g., a clear-panel region showing LCD imagery or an illuminated symbol). Color-coded lighting may be used indicate specific states for the electronic components and/or the gaming machine itself, e.g., active/inactive components, power/volume intensity levels, win/loss/trending states, etc.

Figure 6:
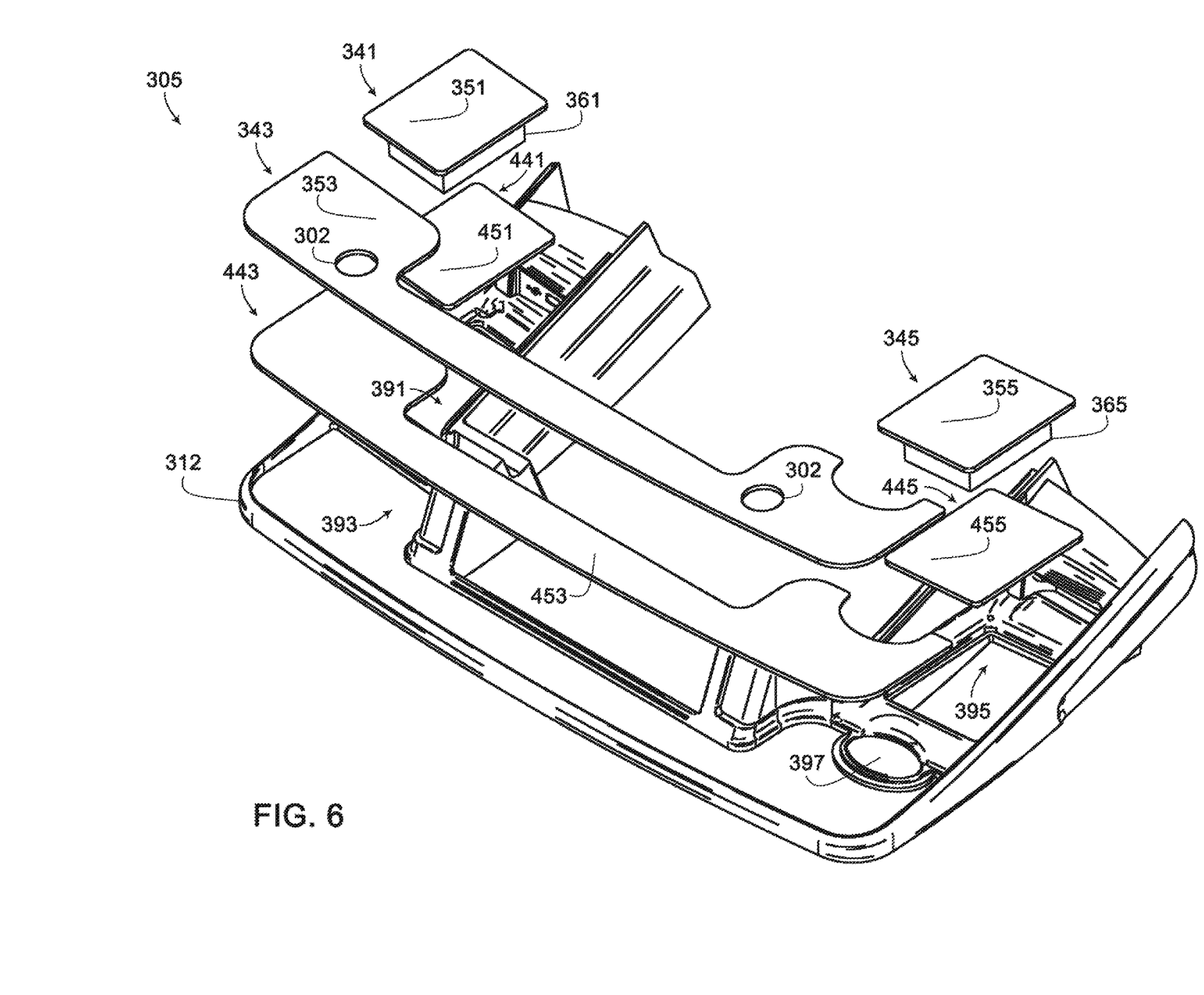
FIG. 6 is an exploded isometric view of a set of player interface deck components available to assemble a player interface deck according to an embodiment of the present invention.

Referring now to FIG. 6, there is illustrated an image of a set of components 305 that can be used selectively to configure a customized gaming machine deck for a gaming machine 100 in one embodiment, such as the deck 210 as previously described in FIGS. 4A and 5A. The set of components 305 includes a deck frame 312 having a left-side partition 391, a central partition 393, a left-side partition 395, and a set of modular panel assemblies 341, 343, 345, 441, 443, 445. The set of modular panel assemblies 341, 343, 345, 441, 443, 445 have corresponding face plates 351, 353, 355, 451, 453, 455, respectively.

The deck frame 312 shares similar structure to deck 210 of FIGS. 4A-5A, and may accommodate similar hardware as previously described. For example, a distinct partition 397 may be afforded to accommodate the button 226 of deck 210. Additional partitions or slots may be provided to accommodate other hardware or structural elements as necessary (e.g., slots 228, 230).

The modular panel assemblies 341, 441, 345, 445 are configured for installation into the partitions 391, 395, and the modular panel assemblies 343, 443 are configured for installation into the partition 393. In one embodiment, the corresponding face plate 351, 451, 355, 455 of each of the modular panel assemblies 341, 441, 345, 445 conform to a standardized footprint size to match the retaining lip 375 of partition 395 and the retaining lip of partition 391 (not shown). Likewise, the cavity of the partitions 391, 395 must be large enough to accommodate the corresponding electronic components 361, 365 of the modular panel assemblies 341, 345, in addition to the electronic components of modular panel assemblies 441, 445 (not shown) to ensure proper fit and installation for each of the assemblies. In other embodiments, the deck frame 312 and resulting partitions are formed such that only "thinner" modular panel assemblies (e.g., 441, 445) properly install into the partition 391 due to depth constraints, yet any of the modular panel assemblies 341, 441, 345, 445 may be installed into the partition 395. Further, the partition 391 may be designed as having a retaining lip (not shown) different from the retaining lip 375 of the partition 395 (in shape, size, or both).

The modular panel assembly 343 is shown having a socket 302 for accommodating an input device or an output device that may require projection through the face plate 353. Different devices coupled to electronic components (either as part of a modular panel assembly or game-logic circuitry) may include input devices manipulated by the player or detect environmental information like imagery, sound, wireless signals, motion, etc. Input devices may also include sensors to detect temperature, lighting levels, or any other quantitative measurement. Input devices of a corresponding modular panel assembly may be integrated or in communication with electronic components separate from the modular panel assembly. Input devices may include one or more of an actuating button, a set of actuating buttons, a joystick, a trackball/rollerball, a pointing device, a rotatable dial, a touch-detection device (e.g., projected capacitive touch or other forms of touch), a pull handle, an infrared (IR) motion sensor, a camera, a microphone, sensor, etc. Input devices that are mounted under the face plate of a modular panel assembly may additionally remain undetectable/invisible during operation. Different modular panel assemblies that are exchanged in a particular partition may be completely indistinguishable from each other prior to activation of the associated electronic components.

Output devices of a modular panel assembly may also be employed to provide lighting, sound, imagery, data flow, device charging, etc., and may include a direct, diffused, or refracted illumination module, speakers, data communication devices, a display device (e.g., LCD display, OLED display, etc.), an inductive charger, a haptic device, etc.

Referring now to FIG. 7A, there is illustrated a modular panel assembly 545 (similar to modular panel assembly 345 in FIG. 6) that can be engaged into a corresponding partition 595 of a deck frame 512 (FIG. 7B) for a gaming machine 100 in one embodiment. The modular panel assembly 545 includes a face plate 555, a set of electronic components 565 mounted to the face plate 555, and a set of modular panel assembly fasteners 582. The fasteners 582 may be threaded, grooved, or have some other fastening feature that provides sufficient friction to keep the modular panel assembly 545 in place when engaged with the mating partition fastener components 584.

Referring now to FIG. 7B, there is illustrated an enhanced view of a section of a deck frame 512 and partition 595 for a gaming machine 100 in one embodiment. The deck frame 512 is similar to the deck frame 212 shown in FIGS. 4A-4B, 5A-5C, having a upper sloped section 511 and a retaining lip 575 for the partition 595. The partition 595 includes a set of partition fasteners 584 spaced for engaging the corresponding panel assembly fasteners 582 of the modular panel assembly 545 shown in FIG. 7A.

Referring now to FIG. 7C, there is illustrated a cross sectional and enhanced view of a section of the deck frame 512 showing the modular panel assembly 545 installed and engaged in the partition 595 by an isolated panel assembly fastener 582 and partition fastener 584 of a deck 510 in one embodiment. The deck frame 512 includes a lower sloped section 513 (similar to lower sloped section 213) that sits flush with the face plate 555 at the edge of the partition 595. The panel assembly fastener 582 and partition fastener 584 engage to rigidly hold the modular panel assembly 545 in the partition 595.

A gasket 585 may be placed to inhibit the flow of liquids and gas where the face plate 555 and the retaining lip 575 converge. The gasket 585 may comprise a separate element that is added during assembly, or be an integrated part of the modular panel assembly 545, the fastener 582, the retaining lip 575, and/or the partition 595.

The fasteners 582, 584 may comprise any of a number of differing mating components that join or affix the modular panel assembly 545 and the deck frame 512 securely in the partition 595. For example, the fasteners 582, 584 may include one or more posts, bolts, nuts, screws, clips, clamps, clasps, pins, hooks, latches, pegs, snaps, braces, etc., that engage with a corresponding fastener mechanism to rigidly hold the assembly 545 and face plate 555 in place in the partition 595.

Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A deck on a gaming machine configured to present a casino wagering game, the deck configured to provide modular functionality associated with the gaming machine to a player at a player position of the gaming machine, the deck comprising:
a plurality of modular panel assemblies including a first modular panel assembly and a second modular panel assembly, each modular panel assembly including:
a faceplate having opposing top and bottom surfaces, the top surface being exposed to the player position;
a set of electronic components disposed beneath the bottom surface of the face plate, mounted to the face plate, and electrically coupled to the gaming machine to provide a respective functionality associated with the gaming machine to the player when active; and
a panel assembly fastener; and
a frame having a plurality of discrete partitions, each partition including:
a partition fastener for engaging the panel assembly fastener of a corresponding one of the plurality of modular panel assemblies; and
a compartment for concealing the set of electronic components of the engaged modular panel assembly beneath its face plate; and
wherein the engaged modular panel assembly for at least one of the partitions is interchangeable between the first and second modular panel assemblies, and wherein until activation of the corresponding set of electronic components, the face plates of the respective first and second modular panel assemblies are indistinguishable when viewed from the player position.

2. The deck of claim 1, wherein at least two of the partitions are positioned at different elevations and at different distances from the player position.

3. The deck of claim 1, wherein the face plate and a corresponding retaining lip of the frame mutually engage a gasket inhibiting the passage of liquid.

4. The deck of claim 1, wherein the face plate comprises a translucent material.

5. The deck of claim 4, wherein the translucent material is glass, acrylic, or plastic.

6. The deck of claim 1, wherein the set of electronic components are adhered to the bottom surface of the face plate of the corresponding modular panel assembly.

7. The deck of claim 1, wherein the panel assembly fastener and the partition fastener include a mated nut and bolt used to engage the modular panel assembly to the frame.

8. The deck of claim 1, wherein the panel assembly fastener and the partition fastener include a latching mechanism used to engage the modular panel assembly to the frame.

9. The deck of claim 1, wherein in response to activation, the corresponding sets of electronic components of the first and second modular panel assemblies perform different functions as indicated via the respective face plate of the first or second modular panel assembly when viewed from the player position.

10. The deck of claim 1, wherein the face plate of at least one of the engaged modular panel assemblies includes a hole exposing an input device for the gaming machine.

11. A gaming system, comprising:
a gaming machine;
a player-interface deck on the gaming machine and configured to provide modular functionality associated with the gaming machine to a player at a player position of the gaming machine, the player-interface deck comprising:
a plurality of modular panel assemblies including a first modular panel assembly and a second modular panel assembly, each modular panel assembly including:
a face plate having opposing top and bottom surfaces, the top surface being exposed to the player position;
a set of electronic components disposed beneath the bottom surface of the face plate, mounted to the face plate, and electrically coupled to the gaming machine to provide a respective functionality associated with the gaming machine to the player when active; and
a panel assembly fastener; and
a frame having a plurality of discrete partitions, each partition including:
a partition fastener for engaging the panel assembly fastener of a corresponding one of the plurality of modular panel assemblies; and a compartment for concealing the set of electronic components of the engaged modular panel assembly beneath its face plate; and game-logic circuitry configured to present a casino wagering game on the gaming machine;

wherein the engaged modular panel assembly for at least one of the partitions is interchangeable between the first and second modular panel assemblies, and wherein until activation of the corresponding set of electronic components, the face plates of the respective first and second modular panel assemblies are indistinguishable when viewed from the player position, and.

12. The gaming system of claim 11, wherein at least one of the modular panel assemblies includes an electronic input device.

13. The gaming system of claim 12, wherein the electronic input device includes an actuation button, a trackball, a pull handle, a joystick, a rotatable dial, a touch-detection device, an infrared (IR) motion sensor, a microphone, or a camera.

14. The gaming system of claim 11, wherein at least one of the modular panel assemblies includes an electronic output device.

15. The gaming system of claim 14, wherein at electronic output device includes an LCD display, an OLED display, an audio speaker, an illumination module providing direct, diffused, or refracted light, an inductive charger, or a haptic device.

16. The gaming system of claim 11, wherein in response to activation the corresponding sets of electronic components of the first and second modular panel assemblies perform different functions as indicated via the respective face plate of the first or second modular panel assembly when viewed from the player position.

17. A method for modifying a deck on a gaming machine to provide a player at a player position modular functionality associated with the gaming machine, the method comprising:

installing a first modular panel assembly into a frame partition of the deck, the first modular panel assembly including a first face plate, a first set of electronic components, and a first panel assembly fastener, the first face plate having a top surface exposed to the player position, the first set of electronic components being disposed beneath a bottom surface of the first face plate, mounted to the first face plate, and electrically coupled to the gaming machine to provide a first respective functionality associated with the gaming machine to the player when active, the frame partition including a compartment and a partition fastener, the compartment concealing the first set of electronic components beneath the first face plate, the partition fastener engaging the first panel assembly fastener; and removing the first modular panel assembly from the frame partition; and installing a second modular panel assembly into the frame partition, the second modular panel assembly including a second face plate, a second set of electronic components, and a second panel assembly fastener, the second face plate having a top surface exposed to the player position, the second set of electronic components being disposed beneath a bottom surface of the second face plate, mounted to the second face plate, and electrically coupled to the gaming machine to provide a second respective functionality associated with the gaming machine to the player when active, the compartment concealing the second set of electronic components beneath the second face plate, the partition fastener engaging the second panel assembly fastener, the first and second sets of electronic components having differing functionality;

wherein until activation of the first or second set of electronic components of the respective installed first or second modular panel assembly, the first and second face plates and the functionality of the respective first and second modular panel assemblies are indistinguishable when the installed modular panel assembly is viewed from the player position.

18. The method of claim 17, wherein the deck is a multi-level deck having at least two frame partitions positioned at different elevations and at different distances from the player position.

19. The method of claim 17, wherein in response to activation of the installed first or second set of electronic components, the respective first or second face plate indicates the functionality of the installed first or second set of electronic components.

20. The method of claim 17, wherein the first or second set of electronic components comprises a plurality of modular sets of corresponding electronic components.

* * * * *